United States Patent
Avataneo et al.

(10) Patent No.: US 9,862,787 B2
(45) Date of Patent: Jan. 9, 2018

(54) CURABLE COMPOSITION

(71) Applicant: SOLVAY SPECIALTY POLYMERS ITALY S.P.A., Bollate (IT)

(72) Inventors: Marco Avataneo, Senago (IT); Aldo Sanguineti, Milan (IT); Matteo Fantoni, Rho (IT); Giuseppe Marchionni, Milan (IT)

(73) Assignee: SOLVAY SPECIALTY POLYMERS ITALY S.P.A., Bollate (Milano) (IT)

( * ) Notice: Subject to any disclaimer, the term of this patent is extended or adjusted under 35 U.S.C. 154(b) by 0 days.

(21) Appl. No.: 14/361,429

(22) PCT Filed: Dec. 11, 2012

(86) PCT No.: PCT/EP2012/075018
§ 371 (c)(1),
(2) Date: May 29, 2014

(87) PCT Pub. No.: WO2013/087596
PCT Pub. Date: Jun. 20, 2013

(65) Prior Publication Data
US 2014/0323661 A1    Oct. 30, 2014

(30) Foreign Application Priority Data
Dec. 12, 2011 (EP) .................. 11193036

(51) Int. Cl.
*C08K 5/03* (2006.01)
*C08F 216/14* (2006.01)
*C08K 5/00* (2006.01)

(52) U.S. Cl.
CPC ...... *C08F 216/1408* (2013.01); *C08K 5/0025* (2013.01); *C08K 5/03* (2013.01)

(58) Field of Classification Search
CPC ... C08L 27/12; C08K 5/0025; C08F 216/1408
See application file for complete search history.

(56) References Cited

U.S. PATENT DOCUMENTS

2010/0324222 A1   12/2010  Hung et al.
2011/0015107 A1*   1/2011  Marchionni et al. ......... 508/465

FOREIGN PATENT DOCUMENTS

EP    2100909 A1    9/2009
WO    2011076652 A1  6/2011

OTHER PUBLICATIONS

Warner B.P. et al., "Controlled acceleration and inhibition of bergman cyclization by metal chlorides", Science, 1995, 269 (5225), p. 814-816.

(Continued)

*Primary Examiner* — Mark Kaucher

(57) ABSTRACT

The invention relates to the use of 1,5-enediyne compounds of formula (I) as curing agents in polymeric systems. In particular the invention relates to a curable composition comprising a curing agent of formula (I) and a fluorinated polymer suitable to be cross-linked and at least one fluorinated aromatic compound.

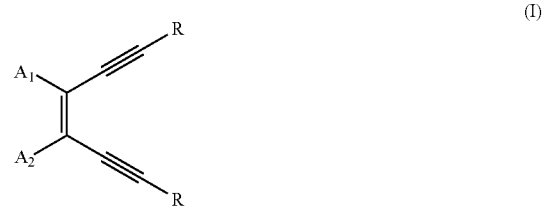

17 Claims, 1 Drawing Sheet

(56) References Cited

OTHER PUBLICATIONS

Smith, Dennis W., Jr. et al., "Polynaphthalene networks from bisphenols", Journal of American Chemical Society (1998), 120, p. 9078-9079—ACS.
Basak, Amit et al., "Chelation-Controlled Bergman Cyclization: Synthesis and Reactivity of Enediynyl Ligands", Chemical Reviews (2003), 103(10), p. 4077-4094—Washington, DC.
Hickenboth CR et al., "Preparation of enediyne-crosslinked networks and their reactivity under thermal and mechanical conditions", Tetrahedron, 2008, vol. 64, p. 8435-8448—XP002567997—Elsevier Ltd.

\* cited by examiner

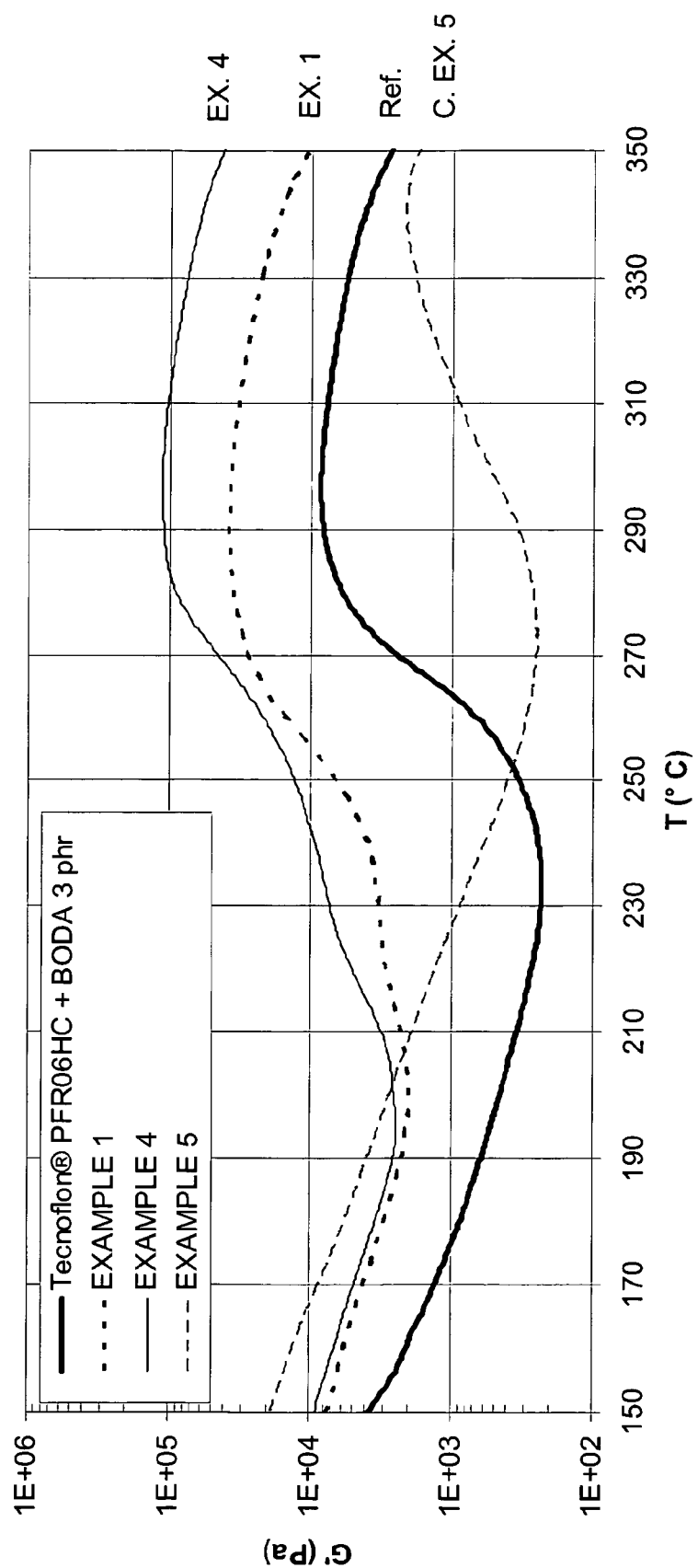

CURABLE COMPOSITION

This application is a U.S. national stage entry under 35 U.S.C. §371 of International Application No. PCT/EP2012/075018 filed Dec. 11, 2012, which claims priority to European application EP11193036.8 filed on Dec. 12, 2011. The entire contents of these applications are explicitly incorporated herein by this reference.

TECHNICAL FIELD

The invention relates to a curable composition comprising a 1,5-enediyne curing agent, a fluorinated polymer suitable to be cross-linked and a fluorinated aromatic compound.

BACKGROUND ART

The cross-linking, or curing, of polymers has been known for many years. Cross-linking, or curing, creates a three-dimensional structure, covalently bridging the polymer chains, that in general provides strength and stability to the polymer. The cross-linking of polymer systems is typically carried out by means of radiation (e.g. electron beam radiation) or by addition of suitable curing agents, e.g. the addition of sulphur in the vulcanization of rubber.

Curable compositions comprising a 1,5-enediyne curing agent have been described in WO 2011/076652 (SOLVAY SOLEXIS SPA) 30 Jun. 2011 which discloses a curable composition comprising:
(a) at least one polymer (P); and
(b) at least one curing agent of formula (I):

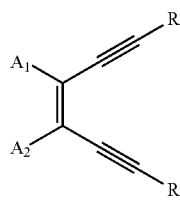

(I)

wherein each R in formula (I), equal to or different from each other, is independently selected from the group consisting of hydrogen; halogen (e.g. F, Cl, Br, I); $C_1$-$C_{20}$ alkyl, linear or branched, optionally substituted and/or optionally fluorinated; $C_1$-$C_{20}$ oxyalkyl, linear or branched, optionally substituted and/or optionally fluorinated; (per)fluoropolyether chain; aromatic or heteroaromatic radical, monocyclic or polycyclic, optionally substituted and/or optionally fluorinated; —$SiR^1_3$, —$(R^1_2SiO)_bR^1$, —$PR^1_2$ wherein each $R^1$, equal to or different from each other, is independently selected from the group consisting of hydrogen, $C_1$-$C_{20}$ alkyl, linear or branched, optionally substituted and/or optionally fluorinated and wherein b is an integer of at least 1; and wherein $A_1$ and $A_2$, equal to or different from each other, are each independently selected from the group consisting of hydrogen; halogen; $C_1$-$C_{20}$ alkyl, linear or branched, optionally substituted and/or optionally fluorinated; $C_1$-$C_{20}$ oxyalkyl, linear or branched, optionally substituted and/or optionally fluorinated; (per)fluoropolyether chain; —$(R^1_2SiO)_bR^1$ wherein $R^1$ and b are as defined; aromatic or heteroaromatic radical, monocyclic or polycyclic, optionally substituted and/or optionally fluorinated; and wherein $A_1$ and $A_2$ may be comprised in an alkyl or aromatic cyclic structure, optionally substituted and/or optionally fluorinated. Polymer (P) may be selected from hydrogenated and fluorinated polymers. The ethynyl groups on adjacent carbon atoms in formula (I) are known to dimerize upon application of heat to form an aromatic ring having a 1,4-diradical. While not being bound by theory, it is believed that the 1,4-diradical may promote the cross-linking or curing process via a Bergman cyclization reaction such as the one disclosed by Warner et al. in Science, 268, (1995), pp. 814-816.

The curable compositions disclosed WO 2011/076652 (SOLVAY SOLEXIS SPA) 30 Jun. 2011 may additionally contain additives capable to improve the dispersion of the curing agent of formula (I) into polymer (P). When polymer (P) is a fluorinated polymer, suitable dispersing additives are described as compounds comprising a (per)fluoropolyether chain said chain comprising either aromatic pendant groups and/or aromatic terminal groups, said aromatic groups being optionally fluorinated.

The Applicant has now surprisingly found that when certain fluorinated aromatic compounds are added to a curable composition comprising a fluorinated polymer and a curing agent of formula (I) as defined above the temperature at which thermally induced curing of the composition takes place can be reduced. Additionally, the elastic modulus of the resulting cured article is generally higher than the elastic modulus of cured articles obtained from the curable compositions disclosed in WO2011/076652.

DEFINITIONS

The term "cross-link" is used herein to refer to a covalent chemical bond bridging one polymer chain to another.

The terms "cross-linking" or "curing" are used herein to refer to a process of chemically joining two or more polymer molecules by cross-links.

A "curing agent" is defined herein as a substance that, added to a polymer and/or polymer composition promotes cross-linking or curing.

The expression "fluorinated" is used herein to refer to compounds (e.g. compounds, polymers, monomers etc.) that are either totally or partially fluorinated, i.e. wherein all or only a part of the hydrogen atoms have been replaced by fluorine atoms. Preferably, the term "fluorinated" refers to compounds that contain a higher proportion of fluorine atoms than hydrogen atoms. More preferably the term refers to compounds that are totally free of hydrogen atoms, i.e. wherein all the hydrogen atoms have been replaced by fluorine atoms.

Within the context of the present invention the expression "at least one" when referred to a "fluorinated polymer", to a "curing agent" and/or to a "fluorinated aromatic compound" is intended to denote one or more than one polymer, and/or curing agent and/or aromatic compound. Mixtures of polymers, curing agents and/or aromatic compounds can be advantageously used for the purposes of the invention.

BRIEF DESCRIPTION OF DRAWINGS

FIG. 1 is a graph showing the storage modulus G' as a function of temperature for a reference composition, the inventive compositions of Examples 1 and 4 and for the comparative composition of Example 5.

DISCLOSURE OF INVENTION

It is thus an object of the present invention to provide a curable composition comprising:

(a) at least one fluorinated polymer (FP);
(b) at least one curing agent of formula (I):

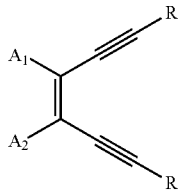
(I)

and
(c) at least one fluorinated aromatic compound (FAC).

Each R in formula (I), equal to or different from each other, is independently selected from the group consisting of hydrogen; halogen (e.g. F, Cl, Br, I); $C_1$-$C_{20}$ alkyl, linear or branched, optionally substituted and/or optionally fluorinated; $C_1$-$C_{20}$ oxyalkyl, linear or branched, optionally substituted and/or optionally fluorinated; (per)fluoropolyether chain; aromatic or heteroaromatic radical, monocyclic or polycyclic, optionally substituted and/or optionally fluorinated; —$SiR^1_3$, —$(R^1_2SiO)_bR^1$, —$PR^1_2$ wherein each $R^1$, equal to or different from each other, is independently selected from the group consisting of hydrogen, $C_1$-$C_{20}$ alkyl, linear or branched, optionally substituted and/or optionally fluorinated and wherein b is an integer of at least 1. R groups may be comprised in a cyclic structure.

The nature of each R group, is not particularly critical to the invention; however, the size of the R groups may, due to steric hindrance, undesirably interfere with the dimerization reaction of the ethynyl groups. In general, any R group which does not prevent the formation of a 1,4-diradical from the reaction of the ethynyl groups upon thermal treatment can be used in the compounds of formula (I) or (II).

Each R group may be preferably selected from hydrogen; halogen (e.g. F, Cl, Br, I); $C_1$-$C_8$ alkyl, linear or branched, optionally substituted and/or optionally fluorinated, e.g. —$CH_3$, —$C(CH_3)_3$, —$CF_3$, —$C_2F_5$, —$C_3F_7$; $C_1$-$C_3$ oxyalkyl, linear or branched, optionally substituted and/or optionally fluorinated, e.g. —$OCH_3$, —$OCF_3$; (per)fluoropolyether chain; —$(R^1_2SiO)_bR^1$ wherein b and $R^1$ are as defined; aromatic or heteroaromatic radical, monocyclic or polycyclic, optionally substituted and/or optionally fluorinated. Preferably R groups are not comprised in a cyclic structure.

When aromatic, each R group will have from 1 to 20 carbon atoms, more preferably from 6 to 15 carbon atoms, even more preferably from 6 to 10 carbon atoms. When aromatic, R is preferably an unsubstituted or substituted phenyl group, e.g. a phenyl substituted with one or more fluorine atoms or with a $C_1$-$C_6$ alkyl or oxyalkyl group optionally fluorinated, e.g. —$CH_3$, —$CF_3$, —$OCH_3$, —$OCF_3$. Even more preferably, when aromatic, R is an unsubstituted phenyl group.

Each R group may be a (per)fluoropolyether chain. Suitable (per)fluoropolyether chains may be represented by formula —$R_F$—$O_z$-T wherein: T is selected from a fluorine atom, a chlorine atom and a $C_1$-$C_3$ (per)fluoroalkyl group comprising, optionally, one or more hydrogen or chlorine atoms; z is equal to 0 or 1; and $R_F$ is a divalent (per)fluoropolyether radical selected from the following:

—$(CF_2CF_2O)_p(CF_2O)_q$—, wherein: p and q are integer numbers such that the q/p ratio is between 0.2 and 4, p being different from zero;

—$(CF_2CF(CF_3)O)_r$—$(CF_2CF_2O)_s$—$(CFX_0O)_t$—,
wherein: $X_0$ is a fluorine atom or —$CF_3$; r and s are integer numbers such that t+s is between 1 and 50, the t/(r+s) ratio is between 0.01 and 0.05, (r+s) being different from zero;

—$(CF(CF_3)CF_2O)_u$—$R'_fO$—$(CF(CF_3)CF_2O)_u$—,
wherein: $R'_f$ is a $C_1$-$C_3$ bifunctional perfluoroalkyl radical; u is an integer of at least one;

—$(CFX_0O)_t$—$(CF_2CF(CF_3)O)_r$—$R'_fO$—$(CF_2CF(CF_3)$ $O)r$-$(CFX_0O)_t$—; wherein: $R'_f$, r, t and $X_0$ are as above;

—$(CF_2(CF_2)_xCF_2O)_v$—, wherein: v is an integer of at least one, x is an integer equal to 1 or 2;

—$(CF_2CF_2CH_2O)_w$—$R'_fO$—$(CH_2CF_2CF_2O)_w$—,
wherein: $R'_f$ is as above; w is an integer of at least one.

Typically p, q, r, s, t, u, v, w and x in the formulas above are selected so that the number average molecular weight of the (per)fluoropolyether radical $R_F$ is between 500 and 10,000, preferably between 800 and 5000.

In formula (I) $A_1$ and $A_2$, equal to or different from each other, are each independently selected from the group consisting of hydrogen; halogen; $C_1$-$C_{20}$ alkyl, preferably $C_1$-$C_{10}$ alkyl, linear or branched, optionally substituted and/or optionally fluorinated; $C_1$-$C_{20}$ oxyalkyl, linear or branched, optionally substituted and/or optionally fluorinated; (per)fluoropolyether chain; —$(R^1_2SiO)_bR^1$ wherein $R^1$ and b are as defined; aromatic or heteroaromatic radical, monocyclic or polycyclic, optionally substituted and/or optionally fluorinated and wherein $A_1$ and $A_2$ may optionally comprise a 1,5-enediyne moiety.

$A_1$ and $A_2$ may be comprised in an alkyl or aromatic cyclic structure, optionally substituted and/or optionally fluorinated, such as:

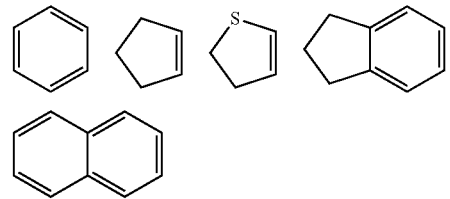

When $A_1$ and $A_2$ are part of an alkyl or, preferably, of an aromatic cyclic structure said structure may be substituted on any of the carbon atoms.

$A_1$ and $A_2$, equal to or different from each other, are preferably selected from the group consisting of hydrogen, fluorinated $C_1$-$C_{20}$ alkyl, preferably $C_1$-$C_{10}$ alkyl, linear or branched; (per)fluoropolyether chain; —$(R^1_2SiO)_bR^1$ wherein b and $R^1$ are as defined above; unsubstituted or substituted phenyl. More preferably at least one of $A_1$ and $A_2$ is a (per)fluoropolyether chain or —$(R^1_2SiO)_bR^1$ as above defined.

Alternatively $A_1$ and $A_2$ are part of an aromatic cyclic structure, preferably an aromatic cyclic structure having from 6 to 10 carbon atoms, more preferably an unsubstituted or substituted phenyl ring.

Representative examples of compounds of formula (I) include but are not

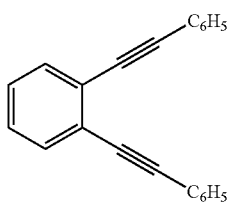

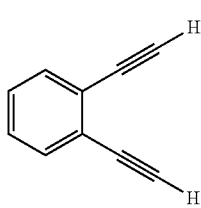

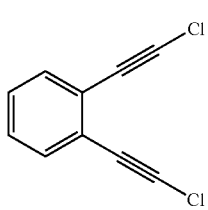

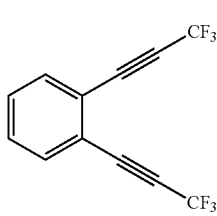

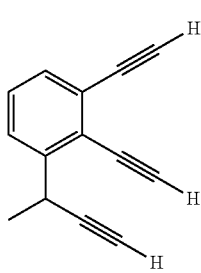

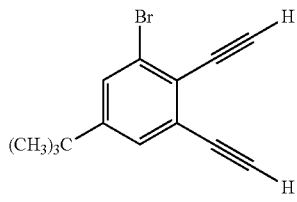

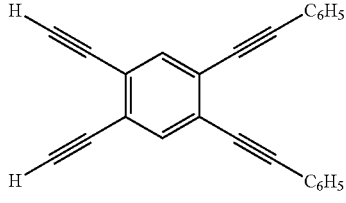

I-1

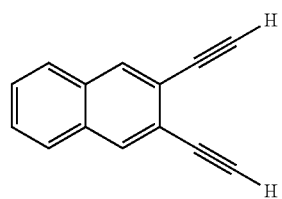

I-8

I-2

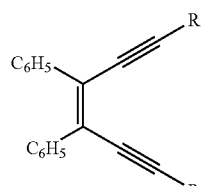

I-9

I-3

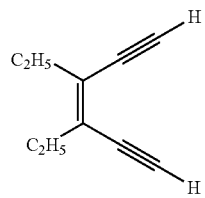

I-10

I-4

I-5

I-6

I-7

In an embodiment of the invention the curing agent is selected among the compounds of formula (I) represented by formula (II):

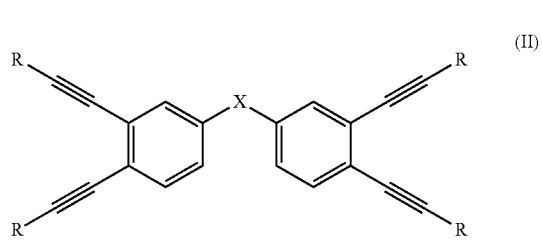

wherein each R in formula (II), equal to or different from each other, is as defined above.

X is a divalent bridging group selected from a carbon-carbon bond; a $C_1$-$C_{20}$ alkylene radical, optionally substituted (e.g. —C(CH$_3$)$_2$—) and/or optionally fluorinated (e.g. —(CF$_2$)$_n$—, —C(CF$_3$)$_2$—); a divalent (per)fluoropolyether radical $R_F$ as defined above; an organopolysiloxane radical —(R$^1_2$SiO)$_b$— wherein R$^1$ and b are as defined above; a —O— radical; a —S— radical; a —SO$_2$— radical; a —C(O)— radical; a fused aromatic or heteroaromatic structure optionally substituted and/or optionally fluorinated.

The divalent bridging group X may be preferably selected from carbon-carbon bond; a $C_1$-$C_{20}$ alkylene radical, optionally substituted, such as —C(CH$_3$)$_2$—; a $C_1$-$C_{20}$ fluorinated alkylene radical, optionally substituted; a divalent (per)fluoropolyether radical $R_F$; an organopolysiloxane radical —(R$^1_2$SiO)$_b$—; a fused aromatic or heteroaromatic structure optionally substituted and/or optionally fluorinated. More preferably X is selected from a $C_1$-$C_{20}$ fluorinated alkylene radical, optionally substituted or a divalent (per)fluoropolyether radical $R_F$ as above defined.

Suitable $C_1$-$C_{20}$ fluorinated alkylene radicals are for instance —C(CF$_3$)$_2$— or those of formula —(CF$_2$)$_n$— wherein n is an integer from 1 to 20, e.g. 2, 3, 4, 6, 8, 10, 12, 14, 16, 18, 20.

Representative examples of compounds of formula (II) include but are not limited to:

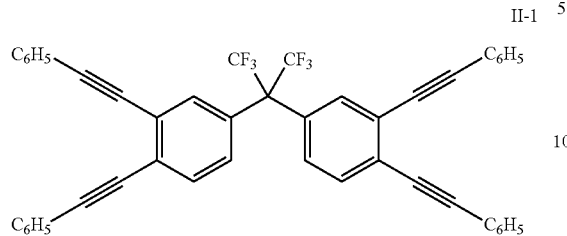

II-1

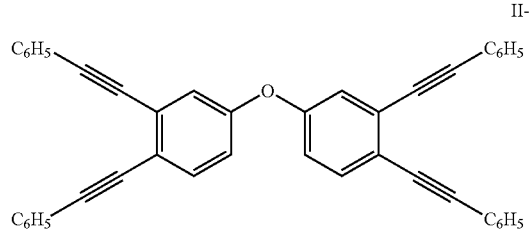

II-2

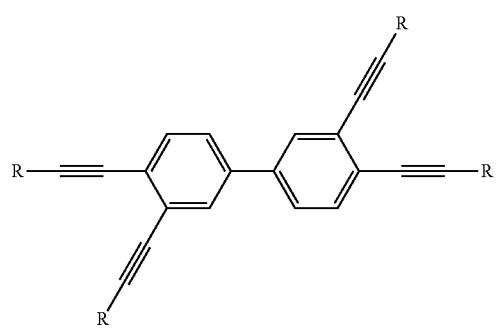

II-3

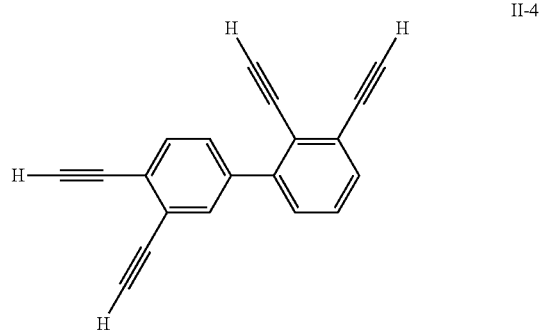

II-4

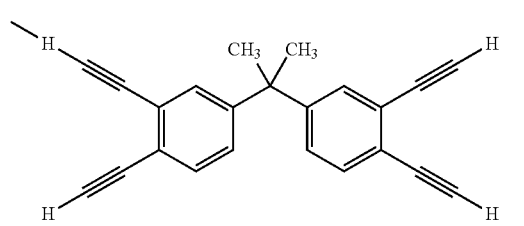

II-5

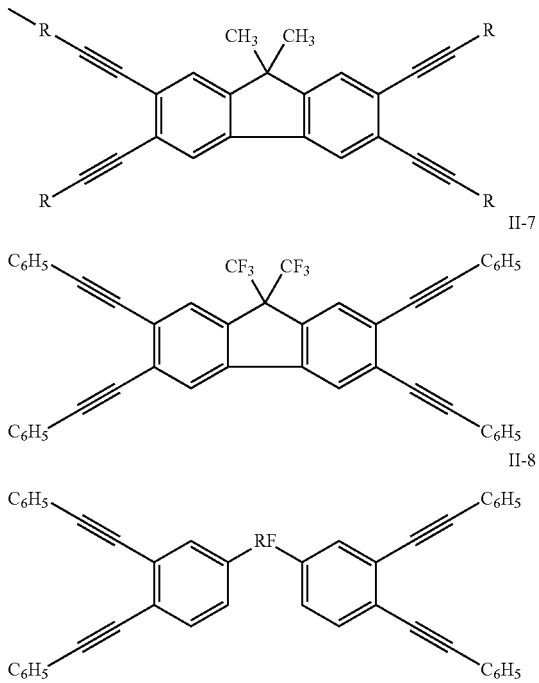

Compounds of formula (I) or (II) can be prepared according to known processes such as those described in Smith, D. W., Babb, D. A.; J. Am Chem. Soc. 120, n. 35, (1998) 9078-9079 or in Basak, A., Mandal, S., Bag, S. S.; Chemical Rev. 103, (2003) 4077-4094.

The amount of curing agent of formula (I) in the curable composition is advantageously of at least 0.1, preferably at least 0.5, more preferably at least 1 weight parts per hundred parts of fluorinated polymer (FP).

The amount of curing agent is advantageously at most 25, preferably at most 20, more preferably at most 15 weight parts per hundred parts of fluorinated polymer (FP).

In a preferred embodiment the curing agent is compound of formula II-1.

The fluorinated polymer (FP) in the curable composition of the invention may be any fluorinated polymer which is suitable to be cross-linked, preferably suitable to be cross-linked with a radical initiated mechanism.

Typically polymers that may be cross-linked by a radical route comprise cure sites in their back-bone, either provided by suitable functional groups present in recurring units from functional monomers incorporated in the polymer chain or provided by reactive end-group, e.g. formed by suitable chain transfer agents (e.g. halogen-containing cure-sites). Fluorinated polymer (FP) typically does not contain any 1,5-enediyne moiety.

Suitable fluorinated polymers are those comprising recurring units derived from at least one fluorinated monomer. Non limiting examples of suitable fluorinated monomers are:

$C_2$-$C_8$ fluoro- and/or perfluoroolefins, such as tetrafluoroethylene, hexafluoropropylene, pentafluoropropylene, and hexafluoroisobutylene;

$C_2$-$C_8$ hydrogenated fluoroolefins, such as vinyl fluoride, 1,2-difluoroethylene, vinylidene fluoride and trifluoroethylene;

(per)fluoroalkylethylenes of formula $CH_2=CH-R_{f0}$, wherein $R_{f0}$ is a $C_1-C_6$ (per)fluoroalkyl or a $C_1-C_6$ (per)fluorooxyalkyl having one or more ether groups;

chloro- and/or bromo- and/or iodo-$C_2-C_6$ fluoroolefins, like chlorotrifluoroethylene;

fluoroalkylvinylethers of formula $CF_2=CFOR_{f1}$ in which $R_{f1}$ is a $C_1-C_6$ fluoro- or perfluoroalkyl, e.g. $-CF_3$, $-C_2F_5$, $-C_3F_7$;

hydrofluoroalkylvinylethers of formula $CH_2=CFOR_{f1}$ in which $R_{f1}$ is a $C_1-C_6$ fluoro- or perfluoroalkyl, e.g. $-CF_3$, $-C_2F_5$, $-C_3F_7$;

fluoro-oxyalkylvinylethers of formula $CF_2=CFOX_1$, in which $X_1$ is a $C_1-C_{12}$ oxyalkyl, or a $C_1-C_{12}$ (per)fluorooxyalkyl having one or more ether groups, like perfluoro-2-propoxy-propyl;

fluoroalkyl-methoxy-vinylethers of formula $CF_2=CFOCF_2OR_{f2}$ in which $R_{f2}$ is a $C_1-C_6$ fluoro- or perfluoroalkyl, e.g. $-CF_3$, $-C_2F_5$, $-C_3F_7$ or a $C_1-C_6$ (per)fluorooxyalkyl having one or more ether groups, like $-C_2F_5-O-CF_3$;

functional fluoro-alkylvinylethers of formula $CF_2=CFOY_0$, in which $Y_0$ is a $C_1-C_{12}$ alkyl or (per)fluoroalkyl, or a $C_1-C_{12}$ oxyalkyl, or a $C_1-C_{12}$ (per)fluorooxyalkyl, said $Y_0$ group having one or more ether groups and $Y_0$ comprising a carboxylic or sulfonic acid group, in its acid, acid halide or salt form;

fluorodioxoles, of formula:

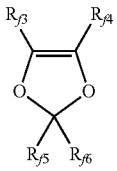

wherein each of $R_{f3}$, $R_{f4}$, $R_{f5}$, $R_{f6}$, equal or different each other, is independently a fluorine atom, a $C_1-C_6$ fluoro- or per(halo)fluoroalkyl, optionally comprising one or more oxygen atom, e.g. $-CF_3$, $-C_2F_5$, $-C_3F_7$, $-OCF_3$, $-OCF_2CF_2OCF_3$.

In addition to fluorinated monomers, fluorinated polymer (FP) may comprise hydrogenated monomers such as ethylene and propylene.

Should the fluorinated polymer comprise recurring units derived from hydrogenated monomers, the amount of recurring units derived from the fluorinated monomers in the fluorinated polymer would be of at least 75% wt, preferably of at least 90% wt, and more preferably of at least 97% wt.

In a first embodiment fluorinated polymer (FP) is a fluoroelastomer. The term "fluoroelastomer" is used herein to refer to amorphous polymers characterised by a heat of fusion, as determined according to ASTM D 3418-08, of less than 5 J/g, preferably of less than 4 J/g, more preferably of less than 1 J/g. Typically fluoroelastomers have a glass transition temperature ($T_g$) below room temperature, in most cases even below 0° C.

Suitable fluoroelastomers advantageously comprise recurring units derived from vinylidene fluoride and/or from tetrafluoroethylene. Preferably, the fluoroelastomer used in the curable composition of the invention consists of recurring units derived from vinylidene fluoride and/or from tetrafluoroethylene and at least one other fluorinated monomer, as above described. In particular suitable fluorinated monomers are selected from:

fluoroalkylvinylethers of formula $CF_2=CFOR_{f1}$, wherein $R_{f1}$ is a $C_1-C_6$ (per)fluoroalkyl, for example trifluoromethyl, bromotrifluoromethyl, penta-fluoropropyl, perfluoromethylvinylether, perfluoroethylvinylether, perfluoropropylvinylether;

fluoro-oxyalkylvinylethers of formula $CF_2=CFOX_0$, wherein $X_0$ is: a $C_1-C_{12}$ perfluorooxyalkyl, containing one or more ether groups, for example perfluoro-2-propoxy-propyl; in particular compounds having general formula:

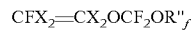

$CFX_2=CX_2OCF_2OR''_f$ wherein $R''_f$ is selected from $C_2-C_6$ linear or branched (per)fluoroalkyl, $C_5-C_6$ cyclic (per)fluoroalkyl, $C_2-C_6$ linear or branched (per)fluorooxyalkyl containing from one to three oxygen atoms, and $X_2$ is hydrogen or fluorine, preferably selected from the following: $CF_2=CFOCF_2OCF_2CF_3$, $CF_2=CFOCF_2OCF_2CF_2OCF_3$, $CF_2=CFOCF_2OCF_3$.

The fluoroelastomer can optionally contain recurring units deriving from $C_3-C_8$ fluoroolefins, optionally containing hydrogen atoms, chlorine and/or bromine and/or iodine, $C_2-C_8$ non-fluorinated olefins, preferably ethylene and/or propylene.

Notable examples of suitable fluoroelastomers are for instance copolymers of vinylidene fluoride, hexafluoropropene, tetrafluoroethylene and perfluoroalkyl vinyl ethers; copolymers of vinylidene fluoride, perfluoroalkyl vinyl ether, and optionally tetrafluoroethylene; copolymers of vinylidene fluoride, $C_2-C_8$ non-fluorinated olefins, hexafluoropropylene and/or perfluoroalkyl vinyl ether and tetrafluoroethylene; copolymers comprising vinylidene fluoride and (per)fluoromethoxyvinyl ether and optionally perfluoroalkyl vinyl ether and tetrafluoroethylene; copolymers of tetrafluoroethylene and perfluoroalkyl vinyl ether.

In a second embodiment fluorinated polymer (FP) is a semi-crystalline fluorinated polymer. The term "semi-crystalline fluorinated polymer" is used herein to refer to fluorinated polymer s characterised by a heat of fusion, as determined according to ASTM D 3418-08, of at least 5 J/g. Suitable semi-crystalline fluorinated polymer s advantageously comprise recurring units derived from vinylidene fluoride, tetrafluoroethylene, chlorotrifluoroethylene, hexafluoropropylene and fluoroalkylvinylethers of formula $CF_2=CFOR_{f1}$ as discussed above.

Notable examples of suitable semi-crystalline copolymers are for instance copolymers of tetrafluoroethylene and hexafluoropropylene, copolymers of tetrafluoroethylene and perfluoromethylvinylether, copolymers of vinylidene fluoride and chlorotrifluoroethylene, copolymers of ethylene and chlorotrifluoroethylene, terpolymers of tetrafluoroethylene, hexafluoropropylene and vinylidene fluoride, poly(vinylidene fluoride).

Fluorinated polymers may optionally comprise recurring units derived from bis-olefins. Non limiting examples of suitable bis-olefins are selected form those of formulas below:

$R_1R_2C=CH-(CF_2)_j-CH=CR_3R_4$ wherein j is an integer between 2 and 10, preferably between 4 and 8, and $R_1$, $R_2$, $R_3$, $R_4$, equal or different from each other, are hydrogen, fluorine or $C_1-C_5$ alkyl or (per)fluoroalkyl group;

$D_2C=CB-O-E-O-CB=CD_2$, wherein each of D, equal or different from each other, is independently selected from hydrogen, fluorine, chlorine; each of B, equal or different from each other is independently selected from hydrogen, fluorine, chlorine and $-OR_B$, wherein $R_B$ is a branched or straight chain alkyl radical which can be partially, substantially or completely fluorinated or chlorinated; E is a divalent group having 2 to 10 carbon atoms, optionally fluorinated, which may be inserted with ether linkages; preferably E is a $-(CF_2)_m-$ group, with m being an integer from 3 to 5; a preferred bis-olefin is $F_2C=CF-O-(CF_2)_5-O-CF=CF_2$; $R_6R_7C=CR_5-E-O-CB=CD_2$, wherein E, D and B have the same meaning as above defined; $R_5$, $R_6$, $R_7$, equal or different from each other, are hydrogen, fluorine or $C_1$-$C_5$ alkyl or (per)fluoroalkyl group.

When a bis-olefin is employed the resulting polymer will typically comprise from 0.01% to 5% by moles of units deriving from the bis-olefin with respect to the total amount of units in the polymer.

Fluorinated polymers suitable for the curable composition of the invention generally include cure sites in the backbone, which enable curing of the fluorinated polymer.

Fluorinated polymer s may comprise recurring units derived from cure-site monomers. The cure site monomer can be partially or fully fluorinated. Suitable cure site monomers are for instance perfluoro(vinyl ether) monomers comprising terminal cyano or perfluorophenyl groups or, preferably, fluorinated monomers containing a halogen other than fluorine. Such a halogen may be present along the fluorinated polymer chain and/or in a terminal position. Typically the halogen is bromine or iodine. Copolymerization is preferred to introduce the halogen in a position along a fluorinated polymer chain. In this route, fluorinated monomers as discussed above are combined with a suitable fluorinated cure site monomer. Examples of suitable halofluoroolefins include: chlorotrifluoroethylene, bromodifluoroethylene, bromotrifluoroethylene, iodotrifluoroethylene, 1-bromo-2,2-difluoroethylene, and 4-bromo-3,3,4,4-tetrafluorobutene-1, 1-iodo-2,2-difluoroethylene, iodo-3,3,4,4-tetrafluorobutene-1, 4-iodo-perfluorobutene-1 and the like. Examples of bromo- or iodo-fluorovinyl ethers include: $BrCF_2OCF=CF_2$, $BrCF_2CF_2OCF=CF2$, $BrCF_2CF_2CF_2OCF=CF_2$, $CF_3CF(Br)CF_2OCF=CF_2$, $ICF_2OCF=CF_2$, $ICF_2CF_2OCF=CF_2$, $ICF_2CF_2CFOCF=CF_2$, $CF_3CFICF_2$ $OCF=CF_2$, and the like. In addition, non-fluorinated halo-olefins, e.g., vinyl chloride, vinyl bromide and 4-bromo-1-butene, can be used. The amount of cure site monomer in a fluorinated polymer is typically from 0.05 to 5% by moles, preferably from 0.1 to 2% by moles.

Cure sites may also occur in the terminal position of a fluorinated polymer chain. Chain transfer agents or initiators are used to introduce the cure site in a terminal position. Generally, a suitable chain transfer agent is introduced in the reaction medium during polymer preparation, or is derived from a suitable initiator.

Examples of useful chain transfer agents include those having the formula $R_{f7}Z_d$ wherein $R_{f7}$ is a substituted or unsubstituted $C_1$-$C_{12}$ fluoroalkyl radical, which may be perfluorinated, Z is Cl, Br or I, and d is 1 or 2. Specific examples include: $CF_2Br_2$, $Br(CF_2)_2Br$, $Br(CF_2)_4Br$, $CF_2(Cl)Br$, $CF_3CF(Br)CF_2Br$, $CF_2I_2$, $I(CF_2)_6I$, $I(CF_2)_4I$, $CF_2Cl_2$, $CF_3CFICF_2I$. Other suitable chain transfer agents are, for example, alkaline or alkaline-earth metal iodides and/or bromides. The amount of a cure site component in a terminal position is generally from 0.05 to 5% by moles, preferably from 0.1 to 2% by moles.

In addition to a fluorinated polymer (FP) and at least one curing agent of formula (I) the curable composition of the invention further comprises at least one fluorinated aromatic compound (FAC).

The term "fluorinated aromatic compound" is used in the present specification to indicate a fluorinated compound comprising at least one aromatic moiety comprising from 5 to 132 $sp^2$ hybridized carbon atoms or a total of from 5 to 120 $sp^2$ hybridized carbon atoms, nitrogen atoms, oxygen atoms and sulphur atoms, said aromatic moiety being free of hydrogen atoms bound to the $sp^2$ hybridized carbon atoms and comprising at least one fluorine atom bound to the $sp^2$ hybridized carbon atoms of the aromatic moiety.

The number of fluorine atoms bound to the $sp^2$ hybridized carbon atoms can be up to the number of $sp^2$ hybridized carbon atoms in the aromatic moiety. Preferably the aromatic moiety comprises at least two fluorine atoms, more preferably at least three fluorine atoms bound to the $sp^2$ hybridized carbon atoms in the aromatic moiety.

For the avoidance of doubts the expression "aromatic moiety" is used herein to denote a cyclic structure having a delocalized conjugated $\pi$ system with a number of $\pi$ delocalized electrons fulfilling Hückel's rule (number of $\pi$ electrons=(4n+2), with n being an integer).

The at least one aromatic moiety in the fluorinated aromatic compound typically comprises from 5 to 60 $sp^2$ hybridized carbon atoms or a total of from 5 to 60 $sp^2$ hybridized carbon atoms, nitrogen atoms, oxygen atoms and sulphur atoms.

Preferably, the at least one aromatic moiety comprises from 6 to 60 $sp^2$ hybridized carbon atoms, more preferably from 6 to 48 $sp^2$ hybridized carbon atoms and even more preferably from 6 to 24 $sp^2$ hybridized carbon atoms.

Non-limiting examples of aromatic moieties include pyrrole, thiophene, benzene, pyridine, pyrazine, imidazole, pyrazole, oxazole, naphtalene, anthracene, phenantrene, fluorene, pyrene, phenanthroline, triphenylene, quinoline, benzimidazole.

The aromatic moiety may be substituted. Suitable substituents are electron withdrawing groups. Notable examples of electron withdrawing groups are halogens (Cl, Br, I); fluorohaloalkyls of the formula $C_aF_{(2a-a'+1)}Z_{a'}$, wherein Z is an halogen selected from Cl, Br, I; a is an integer from 1 to 12, a' is zero or an integer such as a' is less than or equal to (2a+1); perfluoroaryl (e.g. pentafluorophenyl); amino; hydroxyl; nitro; cyano; carboxy; ester; $-SO_2Y$ wherein Y is selected from F, Cl, Br, I.

Fluorinated aromatic compound (FAC) may comprise one or more than one aromatic moiety. Should the fluorinated aromatic compound comprise more than one aromatic moiety, said aromatic moieties may be equal or different from each other.

Fluorinated aromatic compound (FAC) may contain hydrogen atoms, provided they are not bound to the $sp^2$ hybridized carbon atoms of the at least one aromatic moiety. Preferably the fluorinated aromatic compound (FAC) is fully fluorinated.

Fluorinated aromatic compounds wherein the at least one aromatic moiety is benzene, that is a moiety having 6 $sp^2$ hybridized carbon atoms, have been found to be particularly advantageous in the preparation of the inventive compositions.

When the at least one aromatic moiety is benzene it comprises preferably three fluorine atoms, more preferably four fluorine atoms, even more preferably five fluorine atoms bound to the $sp^2$ hybridized carbon atoms in the benzene ring.

Non-limiting examples of suitable fluorinated aromatic compounds comprising benzene as an aromatic moiety are perfluorobenzene; perfluorobiphenyl; perfluorotoluene; perfluoro-p-quinquephenyl; perfluoro-p-sexiphenyl; 1,3,5 (pentafluorophenyl)-2,4,6 fluoro-benzene.

Among the fluorinated aromatic compounds comprising benzene as an aromatic moiety perfluorobenzene, perfluorobiphenyl or perfluorotoluene, in particular perfluorobiphenyl, have been found to be advantageous in the preparation of the inventive composition.

In an embodiment of the invention the at least one fluorinated aromatic compound may be a polymer, said polymer comprising at least one aromatic moiety.

Non-limiting examples of suitable polymeric fluorinated aromatic compounds which are polymers are for instance those described in EP 2100909 A (SOLVAY SOLEXIS SPA) 16 Sep. 2009 and complying with formulas FAC-I to FAC-III here below:

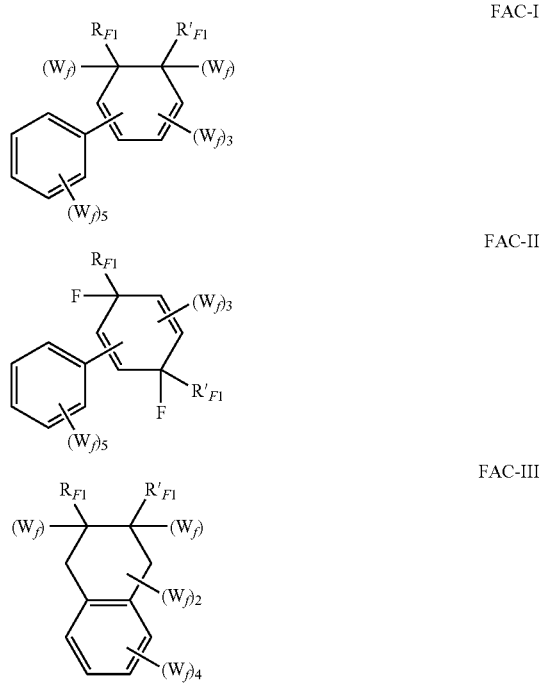

wherein: $R_{F1}$ and $R'_{F1}$, equal or different from each other are fluoropolyoxyalkylene chains bound to a $sp^3$ hybridized carbon atom either via an ether linkage or a C—C bond, optionally bound at their distal end group to another $sp^3$ hybridized carbon atom of a further non-aromatic cyclic moiety; and $W_f$ is a fluorine atom or a $C_1$-$C_6$ perfluorocarbon group, preferably a fluorine atom.

Fluoropolyoxyalkylene chains $R_{F1}$ and $R'_{F1}$ are preferably selected among those of formula: —(O)$_{w0}$—(CFG$^1$O)$_{g1}$(CFG$^2$CFG$^3$O)$_{g2}$(CF$_2$CF$_2$CF$_2$O)$_{g3}$(CF$_2$CF$_2$CF$_2$CF$_2$O)$_{g4}$-G wherein: w0 is zero or 1; G$^1$, G$^2$, G$^3$ equal or different from each other are independently —F, —CF$_3$; g1, g2, g3, and g4, equal or different from each other, are independently integers greater than or equal to 0, such that the number average molecular weight is in the range 280-200000; should at least two of g1, g2, g3 and g4 be different from zero, the different recurring units are generally statistically distributed along the chain; and wherein—G is a group selected from —CF$_3$, —CF$_2$—CF$_3$, —CF$_2$Cl, —CF$_2$CF$_2$Cl, —COF, —CF$_2$, —COF, —CF$_2$OCOF, or is a group bonding directly or through an ether linkage another $sp^3$ hybridized carbon atom of a fluorinated non-aromatic cyclic moiety.

Typically the amount of fluorinated aromatic compound in the curable composition of the invention is of at least 0.01, preferably at least 0.1, more preferably at least 0.5, and even more preferably at least 1 parts per hundred parts of the fluorinated polymer (FP). The amount of fluorinated aromatic compound (FAC) in the curable composition generally is at most 50, preferably at most 35, more preferably at most 25, even more preferably at most 20 parts per hundred parts of fluorinated polymer (FP).

Higher amounts of the fluorinated aromatic compound may be added to the inventive composition however they would not give any additional benefit in terms of improvement in the curing efficiency of the curable composition.

When the fluorinated aromatic compound in the inventive composition is selected from the group consisting of polymeric fluorinated aromatic compounds selected among those of formulas FAC-I, FAC-II and FAC-III as above defined suitable amounts have been found to be of at least 0.5, preferably at least 0.7, more preferably at least 1 parts per hundred parts of fluorinated polymer (FP). The composition generally contains at most 35, preferably at most 25, more preferably at most 20 parts of the polymeric fluorinated aromatic compound of formulas FAC-I, FAC-II or FAC-III per hundred parts of fluorinated polymer. The ratio by weight of the fluorinated aromatic compound of formula FAC-I, FAC-II or FAC-III and the curing agent of formula (I) in the composition ranges advantageously from 1:2 to 4:1, preferably from 1:1.5 to 2.5:1. Satisfactory results have been obtained with ratios fluorinated aromatic compound of formula FAC-I, FAC-II or FAC-III/curing agent of formula (II) of 1:1 and 2:1.

In an embodiment the curable composition comprises:
a fluorinated polymer (FP);
0.1 to 25 parts per hundred parts of fluorinated polymer (FP) of at least one curing agent of formula (I); and
0.5 to 25 parts per hundred parts of fluorinated polymer (FP) of at least one fluorinated aromatic compound (FAC), preferably of a fluorinated aromatic compound of formula FAC-I, FAC-II or FAC-III.

In one aspect of said embodiment the fluorinated polymer is a fluoroelastomer.

In a preferred aspect of said embodiment the curable composition comprises:
a fluoroelastomer;
0.5 to 25 parts per hundred parts of fluoroelastomer of at least one curing agent of formula (II); and
0.5 to 25 parts per hundred parts of fluoroelastomer of at least one polymeric fluorinated aromatic compound selected among those of formulas FAC-I, FAC-II and FAC-III.

The curing agent of formula (II) is preferably compound of formula II-1 defined above.

The curable composition of the invention may comprise in addition to at least one fluorinated polymer (FP), at least one curing agent of formula (I) or (II) and at least one fluorinated aromatic compound (FAC) additional components as known in the art, such as reinforcing fillers, thickeners, pigments, lubricants, antioxidants, stabilizers, processing aids and the like.

The curable composition of the invention may comprise catalysts that promote the dimerization reaction of the ethynyl groups in the curing agent of formula (I) or (II). Suitable catalysts may be selected among late transition metals and late transition metal compounds, preferably among Cu, Ni, Pd, Pt, Ru, Rh metals and their compounds. The metals may be optionally supported, e.g. on supports such as carbon black, graphite. The amount of catalyst is generally from 0.01 to 5% by weight of the metal or metal compound with respect to the weight of the curing agent in the curable composition, preferably from 0.1 to 5% by weight.

Another object of the invention is a process for the manufacture of a curable composition comprising mixing:
(a) at least one fluorinated polymer (FP);
(b) at least one curing agent of formula (I); and
(c) at least one fluorinated aromatic compound (FAC).

Mixing can be carried out by means of any mixing apparatus known to be useful for preparing polymer compositions, including a roller-type rubber mill, a Banbury mixer, a twin-screw extruder and the like. Mixing can also be accomplished in solution, by dissolving the fluorinated polymer (FP), the curing agent and the fluorinated aromatic compound (FAC) in appropriate solvents, optionally followed by precipitation and/or drying. The temperature of the mixture during the mixing process is typically kept below the curing temperature of the composition. Alternatively, the temperature during the mixing process may be such to initiate the curing process in a so-called reactive mixing process.

A further object of the invention is a process for making a cured article from a curable composition comprising at least one fluorinated polymer (FP), at least one curing agent of formula (I) and at least one fluorinated aromatic compound (FAC). Said process typically comprises preparing a curable composition by mixing at least one fluorinated polymer (FP), at least one curing agent of formula (I) and at least one fluorinated aromatic compound (FAC), as described above, and curing said composition. Generally, the process comprises the additional step of shaping the composition before curing.

The curable composition is typically processed and shaped, for instance by extrusion (e.g., into the shape of a film, tube, or hose), by molding (e.g., in the form of sheet or an O-ring) or by casting from a solution (e.g. in the form of a film or a coating). The shaped article can then be heated to cure the polymer composition and form a cured article.

Thus, another object of the invention is a process for the curing of a curable composition comprising heating a composition comprising:
at least one fluorinated polymer (FP);
at least one curing agent of formula (I); and
at least one fluorinated aromatic compound (FAC).

Curing can be advantageously effected by heating the curable composition of the invention at a temperature above the temperature of dimerization of the ethynyl moiety in the curing agent. One skilled in the art will realize that the curing temperature for a particular curing agent will depend on the nature and position of substituents R and $A_1$ and $A_2$ in formulas (I) and (II) as well as on the nature of fluorinated polymer (FP).

Molding or press curing of the curable composition usually is conducted at a temperature sufficient to cure the composition in a desired time.

Surprisingly, the presence in the curable composition of at least one fluorinated aromatic compound (FAC) allows curing to take place at lower temperatures with respect to compositions that do not comprise any fluorinated aromatic compound (FAC). Advantageously curing can take place at temperatures from 50° C. to 300° C., more typically at temperatures from 80° C. to 280° C.

Heating can be applied for a period of from 1 minute to 48 hours, typically from 5 minutes to 60 minutes.

Conventional presses, molds, extruders and the like, provided with suitable heating and curing means can be used to obtain a cured polymer article.

When maximum heat resistance and dimensional stability are required, the curing process may advantageously comprise a post-curing operation wherein the cured polymer article is heated in an oven, e.g. an air-circulating oven, for an additional period of about 1-48 hours and at a temperature of from 200 to 300° C.

A further object of the present invention is a cured article obtained by the curing of the curable composition of the invention. The cured article comprises cross-links which are derived from the dimerization of the ethynyl moieties in the curing agent. The cross-links typically create a three-dimensional network among the polymer chains deriving from fluorinated polymer (FP).

The definitions and preferences defined previously within the context of the curable composition apply to the processes for manufacturing the curable composition, for making a cured article and curing the curable composition as well as to the cured article obtainable from said composition and processes.

The present invention will now be described in more details by reference to the following examples, whose purposes are merely illustrative and do not limit the scope of the invention.

Should the disclosure of any of the patents, patent applications, and publications that are incorporated herein by reference conflict with the present description to the extent that it might render a term unclear, the present description shall take precedence.

Raw Materials

Curing agent: curing agent of formula (II-1), hereinafter referred to as BODA, was prepared following the general procedure described in Smith, D. W., Babb, D. A.; J. Am Chem. Soc. 120, n. 35, (1998) 9078-9079.

Fluorinated polymer (FP): TECNOFLON® PFR06HC is a commercial linear tetrafluoroethylene/perfluoro(methyl vinylether) fluoroelastomer with iodine cure sites in terminal position commercially available from Solvay Solexis SpA.

Fluorinated aromatic compound (FAC): a polymeric fluorinated aromatic compound, hereinafter referred to as PFPE-FAC, was prepared according to Example 3 in EP 2100909 A (SOLVAY SOLEXIS SPA) 16 Sep. 2009.

Characterization

Determination of Storage Modulus (Torsional Pendulum)

Determination of the storage modulus (G') of cured items (torsional pendulum) was carried out according to method ISO 6721-10 using an ARES rheometer in torsional rectangular mode (ISO 6721-7) using a rectangular bar (10 mm wide, 45 mm long) cut from a 1.5 mm thick film. A heating ramp of 2° C./minute from 30 to 300° C. was applied. The oscillation frequency was 1 Hz.

General Procedure for Curing Evaluation (Parallel Plate Geometry)

The curing efficiency of the curable compositions was tested using a non isothermal test. A 25 mm disc was placed between two parallel plates in an ARES rheometer. The disc was heated to 150° C. and equilibrated for 5 minutes. Then a heating ramp of 1° C./min was applied and the storage modulus (G') was measured at a frequency of 1 rad/sec. The test terminated after reaching a temperature of 300° C. The formation of cross-links was evaluated from the ratio of the storage moduli at 300° C. of compositions with the curing agent with respect to the reference sample not containing the curing agent.

EXAMPLES 1-4 AND COMPARATIVE EXAMPLES 5-6

Example 1

100 grams of TECNOFLON® PFR06HC, 3.0 grams of BODA (3.0 weight part per hundred parts of polymer, phr) and 3.0 grams of fluorinated aromatic compound PFPE-FAC (3.0 phr) were dissolved in 2 Kg of hexafluorobenzene under stirring at 40° C. Once the completed dissolution was obtained, the solvent was evaporated by heating the solution at 120° C. under nitrogen flow for 12 hours. A homogeneous polymeric material was obtained. The mixture was then formed in a film shape having a thickness about 1.5 mm by compression molding at 80° C. A disc was cut from the film and tested according to the general curing procedure reported above.

Example 2

Same procedure of Example 1 was repeated but using 3.0 grams of BODA (3.0 phr) and 6.0 grams of PFPE-FAC (6.0 phr).

Example 3

Same procedure of Example 1 was repeated but using 3.0 grams of BODA (3.0 phr) and 1.5 grams of PFPE-FAC (1.5 phr).

Example 4

Same procedure of Example 1 was repeated but using 6.0 grams of BODA (6.0 phr) and 6.0 grams of PFPE-FAC (6.0 phr).

Comparative Examples 5-6

Compositions comprising 3 g (3 phr) and 6 g (6 phr) of PFPE-FAC in TECNOFLON® PFR06HC (Examples of comparison 5 and 6, respectively) were prepared and tested according to the procedure of Example 1.

Reference: a reference composition comprising the same fluorinated polymer TECNOFLON® PFR06HC and BODA (3 phr) was prepared and tested according to the procedure described in Example 1.

The storage modulus G' as a function of temperature for the reference composition, the inventive compositions of Examples 1 and 4 and for the comparative composition of Example 5 are reported in FIG. 1. The value of onset temperature of curing for Examples 1-4, Comparative Examples 5-6 and for the reference composition is reported in Table 1. This temperature is determined as the lower temperature where the derivative of the storage modulus dG'(T)/dT is higher than zero. This value can be identified as the temperature corresponding to the bottom of the curves in FIG. 1.

TABLE 1

| Sample | Onset curing temperature (° C.) |
|---|---|
| Tecnoflon ® PFR06HC + BODA 3 phr | 236 |

TABLE 1-continued

| Sample | Onset curing temperature (° C.) |
|---|---|
| Example 1 | 202 |
| Example 2 | 201 |
| Example 3 | 217 |
| Example 4 | 197 |
| Example 5 (comparison) | 275 |
| Example 6 (comparison) | 260 |

The temperature at which curing of the inventive compositions takes place is advantageously lower than the temperature at which curing of the reference composition initiates. Comparative Examples 5 and 6 show that the improvement in the curing temperature cannot be ascribed to the presence of the fluorinated aromatic compound but it unexpectedly derives from a combination of the curing agent and the fluorinated aromatic compound.

The invention claimed is:
1. A curable composition comprising:
   (a) at least one fluorinated polymer (FP);
   (b) at least one curing agent of formula (I):

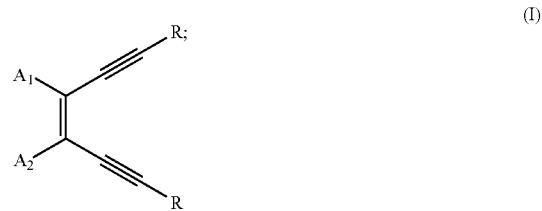

wherein
   each R, equal to or different from each other, is independently selected from the group consisting of hydrogen; halogen; $C_1$-$C_{20}$ alkyl, linear or branched, optionally substituted and/or optionally fluorinated; $C_1$-$C_{20}$ oxyalkyl, linear or branched, optionally substituted and/or optionally fluorinated; (per)fluoropolyether chain; aromatic or heteroaromatic radical, monocyclic or polycyclic, optionally substituted and/or optionally fluorinated;
   —$SiR^1_3$, —$(R^1_2SiO)_bR^1$, —$PR^1_2$,
   each $R^1$, equal to or different from each other, is independently selected from the group consisting of hydrogen, $C_1$-$C_{20}$ alkyl, linear or branched, optionally substituted and/or optionally fluorinated and wherein b is an integer of at least 1; and
   $A_1$ and $A_2$, equal to or different from each other, are each independently selected from the group consisting of hydrogen; halogen; $C_1$-$C_{20}$ alkyl, linear or branched, optionally substituted and/or optionally fluorinated; $C_1$-$C_{20}$ oxyalkyl, linear or branched, optionally substituted and/or optionally fluorinated; (per)fluoropolyether chain; —$(R^1_2SiO)_bR^1$; and aromatic or heteroaromatic radical, monocyclic or polycyclic, optionally substituted and/or optionally fluorinated; or wherein $A_1$ and $A_2$, together with the carbons to which they are attached, form an alkyl or aromatic cyclic structure, optionally substituted and/or optionally fluorinated; and (c) at least one fluorinated aromatic compound (FAC) selected from compounds of formulae (FAC-I), (FAC-II) and (FAC-III):

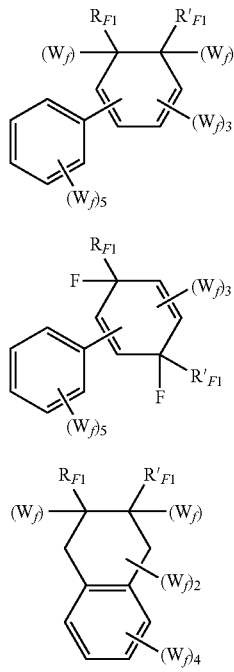

wherein:
$R_{F1}$ and $R'_{F1}$, equal or different from each other are fluoropolyoxyalkylene chains bound to an $sp^3$ hybridized carbon atom of the core molecule either via an ether linkage or a C—C bond, optionally bound at their distal end group to another $sp^3$ hybridized carbon atom of a further non-aromatic cyclic moiety; and $W_f$ is a fluorine atom or a $C_1$-$C_6$ perfluorocarbon group.

2. The composition according to claim 1, wherein the curing agent is selected from compounds of formula (II):

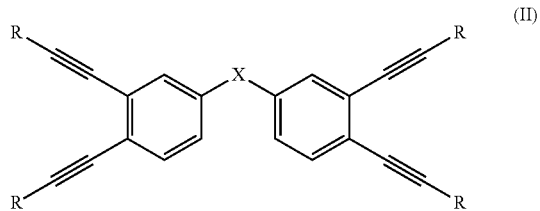

wherein X is a divalent bridging group selected from a carbon-carbon bond; a $C_1$-$C_{20}$ alkylene radical, optionally substituted and/or optionally fluorinated; a divalent (per)fluoropolyether radical; an organopolysiloxane radical —$(R^1_2SiO)_b$—; an —O— radical; an —S— radical; an —$SO_2$— radical; a —C(O)— radical; and a fused aromatic or heteroaromatic structure optionally substituted and/or optionally fluorinated.

3. The composition according to claim 2, wherein X is selected from a carbon-carbon bond; a fluorinated $C_1$-$C_{20}$ alkylene radical, optionally substituted; a divalent (per)fluoropolyether radical; and an organopolysiloxane radical —$(R^1_2SiO)_b$—.

4. The composition according to claim 3, wherein each R, equal to or different from each other, is independently selected from the group consisting of hydrogen; halogen; $C_1$-$C_8$ alkyl, linear or branched, optionally substituted and/or optionally fluorinated; $C_1$-$C_3$ oxyalkyl, linear or branched, optionally substituted and/or optionally fluorinated; (per)fluoropolyether chain; —$(R^1_2SiO)_bR^1$; and aromatic or heteroaromatic radical, monocyclic or polycyclic, optionally substituted and/or optionally fluorinated.

5. The composition according to claim 1, wherein the composition contains at least 0.01 parts of at least one fluorinated aromatic compound (FAC) per hundred parts of fluorinated polymer (FP).

6. The composition according to claim 1, wherein the composition contains at least 0.1 parts of at least one curing agent of formula (I) per hundred parts of fluorinated polymer (FP).

7. The composition according to claim 1, wherein fluorinated polymer (FP) is a semi-crystalline fluorinated polymer.

8. The composition according to claim 1, wherein the fluorinated polymer (FP) is a fluoroelastomer.

9. The composition according to claim 1, wherein the composition comprises: a fluoroelastomer; 0.5 to 25 parts by weight of at least one curing agent selected from compounds of formula (II) per hundred parts of the fluoroelastomer; and 0.5 to 25 parts by weight of at least one polymeric fluorinated aromatic compound selected from compounds of formulae (FAC-I), (FAC-II) and (FAC-III) per hundred parts of the fluoroelastomer.

10. A process for the manufacture of a curable composition of claim 1, the process comprising mixing at least one fluorinated polymer (FP); at least one curing agent of formula (I), and at least one fluorinated compound (FAC).

11. A process for curing a curable composition, the process comprising heating a composition of claim 1, such that the composition is cured.

12. A process of making a cured article, the process comprising: providing a curable composition of claim 1, shaping the composition; curing the shaped composition to form an article; and optionally post curing the article.

13. The composition according to claim 1, wherein each R, equal to or different from each other, is independently selected from the group consisting of hydrogen; halogen; $C_1$-$C_8$ alkyl, linear or branched, optionally substituted and/or optionally fluorinated; $C_1$-$C_3$ oxyalkyl, linear or branched, optionally substituted and/or optionally fluorinated; (per)fluoropolyether chain; —$(R^1_2SiO)_bR^1$; and aromatic or heteroaromatic radical, monocyclic or polycyclic, optionally substituted and/or optionally fluorinated.

14. The composition according to claim 9, wherein the composition comprises: a fluoroelastomer; 1 to 15 parts by weight of the curing agent selected from compounds of formula (II) per hundred parts of the fluoroelastomer; and 1 to 20 parts by weight of at least one polymeric fluorinated aromatic compound selected from compounds of formulae (FAC-I), (FAC-II) and (FAC-III) per hundred parts of the fluoroelastomer.

15. The composition of claim 2, wherein the curing agent of formula (II) comprises at least one of the following compounds:

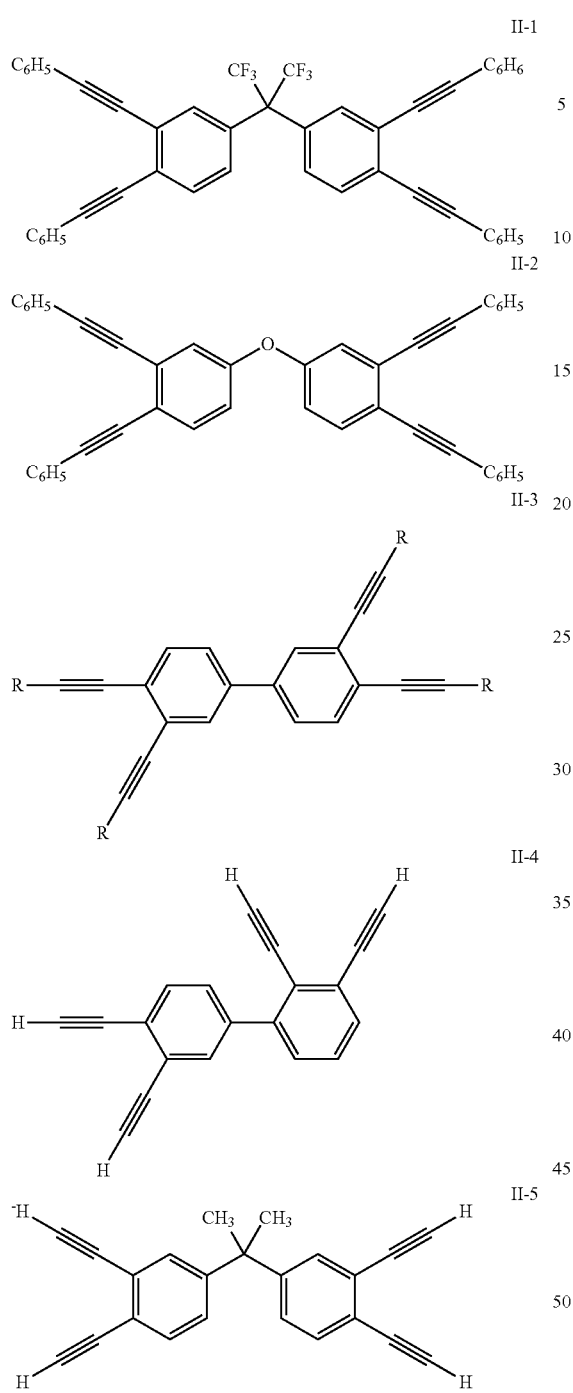

16. The composition of claim 15, wherein the curing agent of formula (II) comprises a compound of formula (II-1).

17. The composition of claim 1, wherein $R_{F1}$ and $R'_{F1}$ are each independently —$(O)_{w0}$—$(CFG^1O)_{g1}(CFG^2CFG^3O)_{g2}$ $(CF_2CF_2CF_2O)_{g3}(CF_2CF_2CF_2CF_2O)_{g4}$-G wherein: w0 is zero or 1; $G^1$, $G^2$, $G^3$ equal or different from each other are independently —F or —$CF_3$; g1, g2, g3, and g4, equal or different from each other, are independently integers greater than or equal to 0, such that the number average molecular weight of the compound between 280 and 200000; and G is a group selected from —$CF_3$, —$CF_2$—$CF_3$, —$CF_2Cl$, —$CF_2CF_2Cl$, —COF, —$CF_2$, —COF, and —$CF_2OCOF$, or G is a fluorinated non-aromatic cyclic moiety bound via an sp³ hybridized carbon atom directly or through an ether linkage.

* * * * *